(12) United States Patent
Felbach

(10) Patent No.: US 8,392,743 B2
(45) Date of Patent: Mar. 5, 2013

(54) MASTER CLOCK GENERATION UNIT FOR SATELLITE NAVIGATION SYSTEMS

(75) Inventor: Dirk Felbach, Baldham (DE)

(73) Assignee: Astrium GmbH, Taufkirchen (DE)

( * ) Notice: Subject to any disclaimer, the term of this patent is extended or adjusted under 35 U.S.C. 154(b) by 394 days.

(21) Appl. No.: 12/767,081

(22) Filed: Apr. 26, 2010

(65) Prior Publication Data

US 2010/0271101 A1    Oct. 28, 2010

(30) Foreign Application Priority Data

Apr. 27, 2009   (EP) ..................... 09005827

(51) Int. Cl.
*G06F 1/00*      (2006.01)
*H03L 7/24*      (2006.01)
*H03B 15/00*     (2006.01)

(52) U.S. Cl. ............ 713/500; 713/501; 331/44; 331/59; 331/60

(58) Field of Classification Search .................. 713/500, 713/501; 331/44, 59, 60
See application file for complete search history.

(56) References Cited

U.S. PATENT DOCUMENTS

| | | | |
|---|---|---|---|
| 3,518,567 A | 6/1970 | Helgesson | |
| 5,168,478 A | 12/1992 | Baker | |
| 5,673,006 A | 9/1997 | Reinhardt | |
| 2005/0123078 A1 | 6/2005 | Felbach | |

FOREIGN PATENT DOCUMENTS

EP    1 748 332 A2    1/2007

OTHER PUBLICATIONS

EPO Search Report, dated Sep. 14, 2009 (7 pages).

*Primary Examiner* — Vincent Tran
(74) *Attorney, Agent, or Firm* — Crowell & Moring LLP

(57) ABSTRACT

A master clock generation unit for satellite navigation systems, comprises a plurality of frequency inputs for receiving a respective atomic clock signal, each having a first or a second reference frequency, and a number of frequency converters each having an input connected to one of the frequency inputs and an output. Each of the frequency converters receives an offset frequency (selected according to the first and second reference frequency at the assigned frequency input) from at least one frequency synthesizer, for providing the same intermediate frequency at each of the converter outputs. A switching matrix is connected to each of the converter outputs for selecting one of the intermediate frequencies as a primary clock provided at a first matrix output, and another of the intermediate frequencies as a secondary clock provided at a second matrix output. A frequency generator having an input connected to the first matrix output and connected to a number of frequency outputs of the master clock generation unit, derives an output reference frequency from the primary clock, and provides it at the frequency outputs. A phase meter having a first meter input connected to the first matrix output and a second meter input connected to the second matrix output, determines a phase difference between the primary and the secondary clock for detecting abnormal behavior.

20 Claims, 4 Drawing Sheets

Fig. 1 – Prior Art

MASTER CLOCK GENERATION UNIT FOR SATELLITE NAVIGATION SYSTEMS

BACKGROUND AND SUMMARY OF THE INVENTION

This application claims the priority of European patent document 09 005 827.2, filed Apr. 27, 2009, the disclosure of which is expressly incorporated by reference herein.

The invention relates to a master clock generation unit for satellite navigation systems, and to a master clock generation system.

A master clock generation unit known as Clock Monitor and Control Unit (CMCU) is a high performance 10.23 MHz master clock generation unit for satellite navigation systems. Two frequency synthesizers can select independently one of four signal inputs to which independent 10 MHz atomic clock frequency references can be provided as a basis for the master clock generation. One of the two synthesizer outputs is selected to provide a master clock for a payload and is distributed to up to four identical outputs. The output signal of the second synthesizer provides a hot redundant alternative for the master clock. A phase meter monitors the output phase of the active synthesizer against the hot redundant one.

Accordingly, the clock monitoring and control unit being part of the payload for satellite navigation systems generates a satellite's Master Timing Reference (MTR) signal based on input signals provided by atomic standards. The functional concept of a known master clock generation unit is shown in FIG. 1. The master clock generation unit or CMCU 100 derives an output reference frequency, namely a 10.23 MHz on-board Master Timing Reference (MTR), based on a set of four atomic frequency standards which are fed to frequency inputs 102, 104, 106 and 108. Each of the frequency inputs 102, 104, 106, 108 is connected to a respective matrix input 131, 132, 133, 134 of a 4×2 switching matrix 130. The switching matrix 130 enables selecting a nominal (primary) and a redundant (secondary) clock at a first and a second matrix output 135, 136. The switching matrix 130 is telecommanded via a controller 180. The nominal and the redundant clock at the first and the second matrix output 135, 136 are fed to a first and a second frequency synthesizer 140, 145. The frequency synthesizers 140, 145 are adapted to perform a frequency conversion according to different clock types: a Passive Hydrogen Maser (PHM) and a Rubidium Clock (RAFS). The respective synthesizer outputs 142, 147 are connected to a phase meter 170 and a switch 175. The phase meter 170 monitors the phase difference between the output signals of the frequency synthesizers 140, 145 and stores the results for later retrieval. One of the two synthesizers 140, 145 output signals is selected by the switch 175 to provide the 10.23 MHz reference frequency at four frequency outputs 202, 204, 206, 208 to the payload.

The above described master clock generation unit 100 is provided in identical manner in a master clock generation system 1 twice. Since both the nominal master clock generation unit (indicated by N in the left part of the master clock generation system) and the redundant master clock generation unit (indicated by R in the right part of FIG. 1) are identical for providing cold redundancy only the nominal CMCU-N is depicted with reference numerals.

The solution depicted in FIG. 1 and comprising a simplified switch matrix is currently used in Galileo satellite system. A major disadvantage of the described master clock generation unit is that, due to the different clock input frequencies, two frequency synthesizers 140, 145 are needed to perform phase comparison later on.

It is therefore an object of the present invention to provide a master clock generation unit for satellite navigation systems which can be built with cheaper manufacturing and part costs. Furthermore, a master clock generation unit is to be provided which can provide a more accurate master timing reference.

These and other objects and advantages are achieved according to the invention by a master clock generation unit for satellite navigation systems, known as Clock Monitoring and Control Unit CMCU, which comprises a number of frequency inputs for receiving a respective atomic clock signal, each clock signal having a first or a second reference frequency, and a number of frequency converters, each of which has a converter input connected to one of the frequency inputs and a converter output. Each of the frequency converters is supplied with an offset frequency by one or a number of frequency synthesizers, the offset frequency being selected according to the first and the second reference frequency at the assigned frequency input for providing the same intermediate frequency at each converter output. A switching matrix is connected to each of the converter outputs for selecting one of the intermediate frequencies as a primary clock provided at a first matrix output, and another of the intermediate frequencies as a secondary clock provided at a second matrix output. A frequency generator which has a generating input connected to the first matrix output and is connected to a number of frequency outputs of the master clock generation unit, is adapted for deriving an output reference frequency from the primary clock and providing the output reference frequency at the number of frequency outputs. A phase meter having a first meter input connected to the first matrix output and a second meter input connected to the second matrix output is provided for determining a phase difference between the primary and the secondary clock to detect abnormal operation.

In another aspect of the invention a master clock generation system comprising two master clock generation units according to the invention for redundancy purposes is provided.

The master clock generation unit according to the invention guarantees high isolation between the input signals (i.e., the atomic clock signals). Furthermore, it accepts signals from different clock types which are operating on different frequencies in any combination. The master clock generation unit avoids any hard switching of the output signal, and therefore avoids phase jumps that might affect the remaining payload. A further advantage is an increase in resolution of the phase meter to provide more accurate results. At last, rapid changes of the reference frequency can be detected.

In a preferred embodiment the clock generation unit comprises up to four frequency inputs, two of them receiving the atomic clock signal having the first reference frequency and the other two receiving the atomic clock signal having the second reference frequency. The first reference frequency corresponds to 10.0028 MHz according to Phase Hydrogen Maser (PHM). The second reference frequency corresponds to 10.00 MHz according to Rubidium Clock (RAFS). The up to four input signals from the atomic clocks are down-converted to an intermediate frequency for further processing. To cope with the different frequencies of PHM and RAFS, it is preferred to provide two frequency converters assigned to signals according to PHM and two signals for RAFS which are driven by different frequency synthesizers. The frequency synthesizers are known as direct digital frequency synthesizers (DDS). By applying different offset frequencies to the frequency converters, both clock signals can be converted to the same intermediate frequency for further processing.

In a preferred embodiment each of the frequency converters comprises a first conversion stage for mixing the first reference frequency and the second reference frequency, respectively, with a reference frequency to a respective first and second pre-intermediate frequency, before tuning the first and the second pre-intermediate frequency to the same intermediate frequency provided at each of the converter outputs in a second conversion stage. It is preferred that the reference frequency is the output reference frequency provided by an oscillator of the frequency generator of the clock generation unit.

According to a further preferred embodiment one of the intermediate frequencies fed to the switching matrix can be chosen as a primary clock, and another can be chosen as a secondary clock, in the switching matrix. In the intermediate frequency domain, one of the clocks can be selected by the switching matrix as the primary clock from which to derive the master clock generation unit output signals. The second clock, kept for hot redundancy, will be routed through the switching matrix to the phase meter to be compared with a signal from the primary one.

According to a further embodiment of the invention, the frequency generator comprises a phase frequency detector for comparing the first clock with a signal derived from the second reference frequency, by a frequency division. Furthermore, an error signal generated by the frequency generator is used to control the reference frequency.

In a further embodiment of the invention, the phase meter arrangement comprises a number of phase meters that are connected to each of an assigned converter output for receiving the intermediate frequencies (i.e., down-converted reference frequencies), and connected to a reference clock signal as provided to the phase frequency detector of the frequency generator.

In still another embodiment of the invention, the phase meter stores a number of measurement samples in pre-determined time intervals for later retrieval. The phase meter determines the phase difference between the two input signals in programmable time intervals. Preferably, up to 1000 measurement samples can be stored inside the master clock generation unit for later retrieval by a data handling system. For rapid detection of any abnormal behavior of one of the two clocks, the phase meter preferably comprises a frequency discontinuity detector in addition.

The output reference frequency corresponds to 10.23 MHz.

The master clock generation unit according to the invention is powered by a primary power bus, especially a regulated bus providing a voltage of 50 V, from a spacecraft. Furthermore, it is useful if the switching matrix, the frequency synthesizers and the phase meter are commanded and supervised via a data interface which can be a standard serial interface. The master clock generation unit furthermore preferably provides discrete telemetry of the on/off status, voltage and current monitoring and thermistor telemetry.

Other objects, advantages and novel features of the present invention will become apparent from the following detailed description of the invention when considered in conjunction with the accompanying drawings.

DETAILED DESCRIPTION OF THE DRAWINGS

Figure 1:
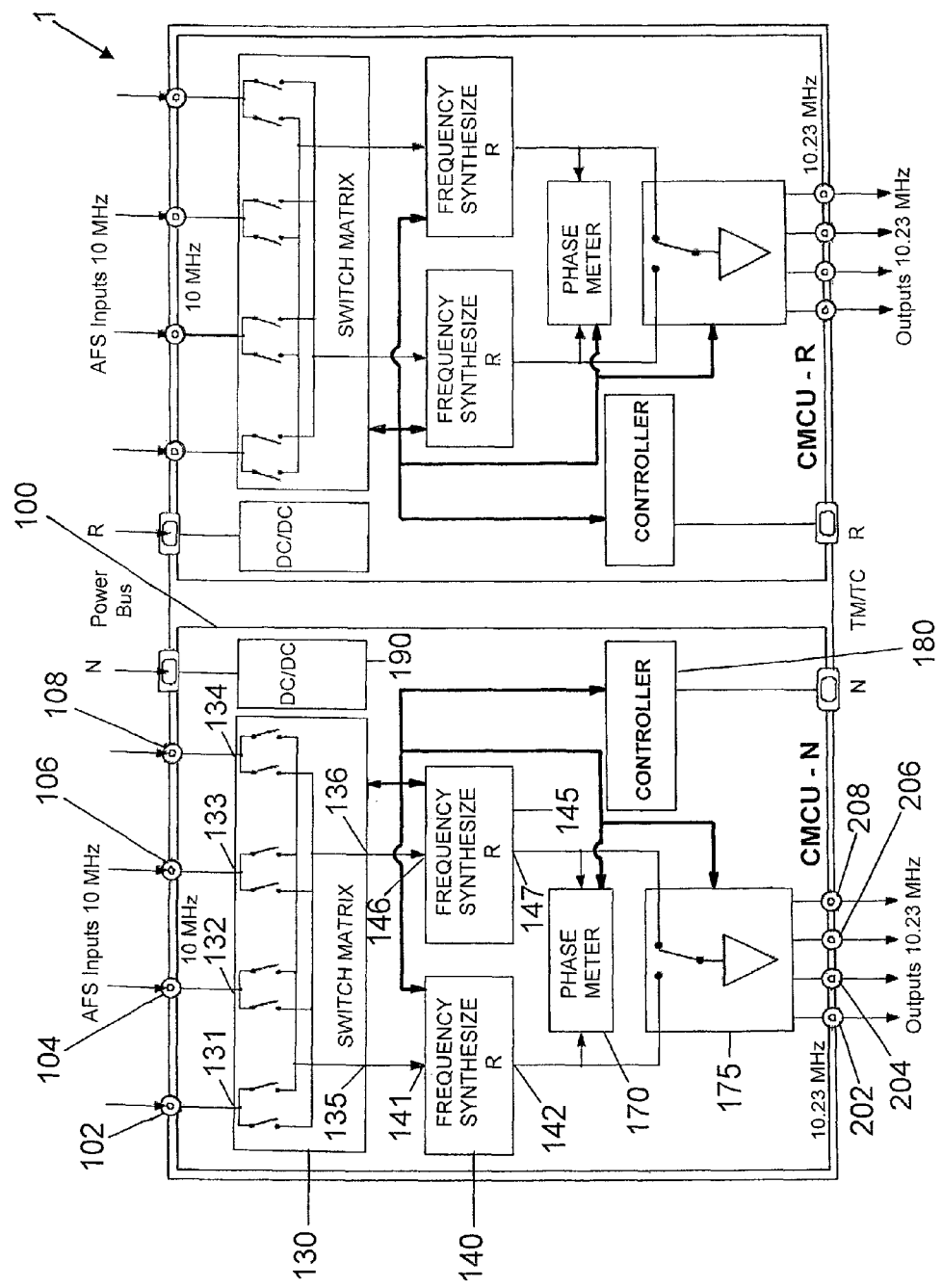
FIG. 1 is a block diagram of a known master clock generation system comprising two identical master clock generation units for redundancy.
Figure 2:
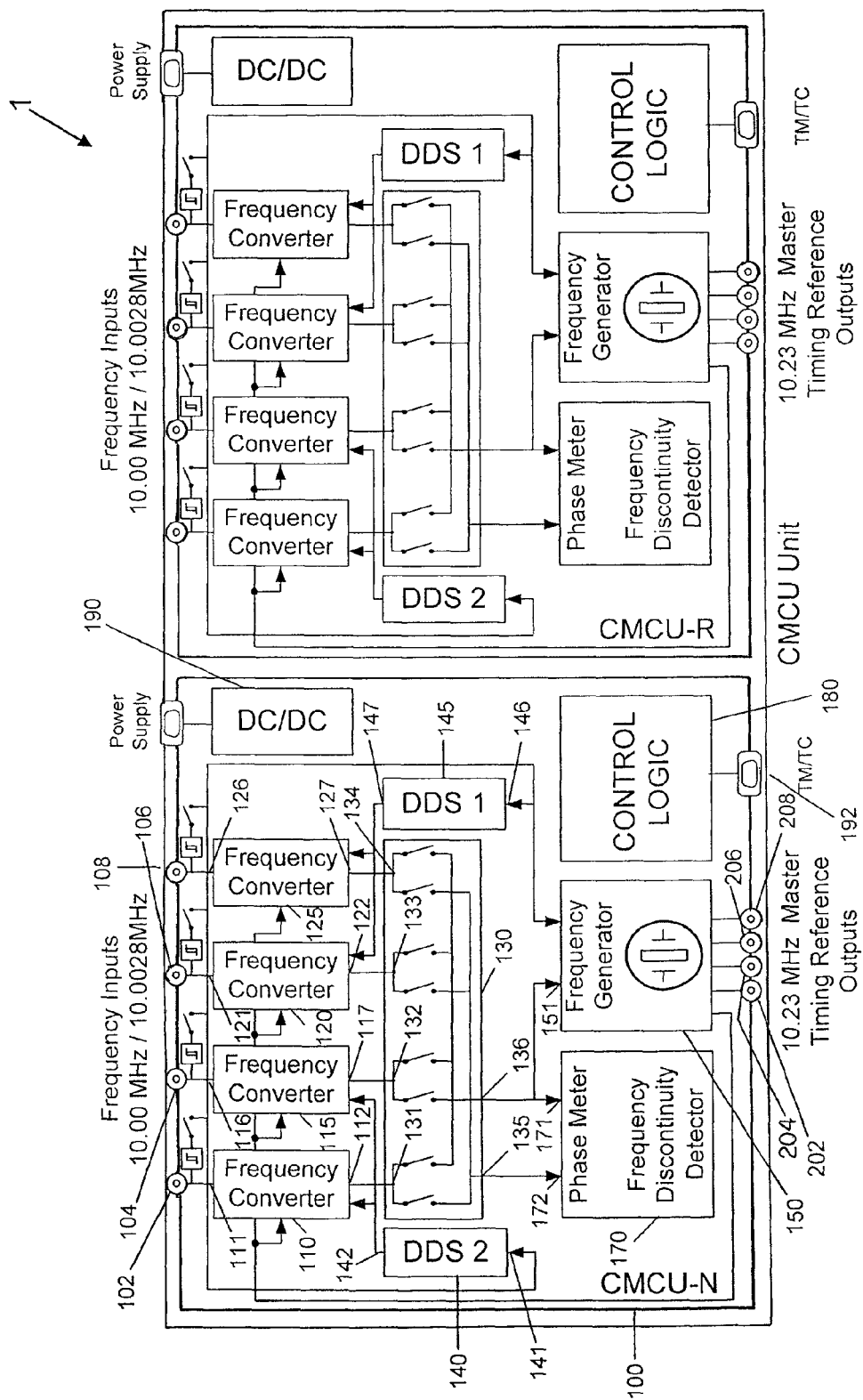
FIG. 2 is a block diagram of a master clock generation system according to the invention comprising two identical master clock generation units.

FIG. 2 is a block diagram of a master clock generation system according to the invention. The master clock generation system 1, known as a CMCU system, comprises first and second identically configured master clock generation units. The master clock generation unit 100 shown on the left side in FIG. 2 represents a so-called nominal master clock generation unit (CMCU-N) whereas the second master clock generation unit on the right side in FIG. 2 represents a redundant CMCU (CMCU-R).

The master clock generation unit 100 according to the invention comprises up to four frequency inputs 102, 104, 106, 108, two of which are supplied with a first reference frequency which corresponds to 10.0028 MHz according to Passive Hydrogen Maser (PHM), while the other two are supplied with a second reference frequency corresponding to 10.00 MHz, according to Rubidium Clock (RAFS).

The first and the second reference frequencies are applied to individual down-conversion stages. Therefore, a number of frequency converters 110, 115, 120, 125 corresponding to the number of frequency inputs 102, 104, 106, 108 is provided. Each of the frequency converters 110, 115, 120, 125 comprises a respective converter input 111, 116, 121, 126 connected to one of the assigned frequency inputs 102, 104, 106, 108. Each of the frequency converters 110, 115, 120, 125 is supplied with a first offset frequency by a frequency generator 150 and a second offset frequency either by a frequency synthesizer 140 or a frequency synthesizer 145. The offset frequency provided by the frequency synthesizers 140, 145 is selected according to the first and the second reference frequency at the assigned frequency input and the assigned frequency converter, respectively, for providing a same intermediate frequency at each of the converter outputs 112, 117, 122, 127. As will be described later in more detail the frequency synthesizers 140, 145 receive a 10.00 MHz signal at their synthesizer input 141, 146 from a selected reference frequency input as one of the inputs 102, 104, 106, 108. The generated offset frequencies at synthesizer outputs 142, 147 are used for mixing with the first and second reference frequency as already down converted by mixing with the first offset frequency for making the down conversion and providing the same intermediate frequency at each of the frequency converter outputs 112, 117, 122, 127.

The converter outputs 112, 117, 122, 127 are connected to matrix inputs 131, 132, 133, 134 of a switching matrix 130. Within the 4×2 switching matrix 130 one of the intermediate frequencies fed to the matrix inputs can be selected as a primary (nominal) clock at a first matrix output 136. Another of the intermediate frequencies can be selected as a secondary (redundant) clock provided at a second matrix output 135. The first matrix output 136 is connected to a phase meter 170 and the frequency generator 150.

The second matrix output 135 is connected only to the phase meter 170, which monitors the phase difference between the primary and the secondary clock of the two frequency synthesizers 140, 145 and stores the results for later retrieval in a memory. For example, the phase meter 170 determines the phase difference between the primary and the secondary clock in programmable time intervals. Up to 1000 measurement samples can be stored inside the master clock generation unit 100 for later retrieval by a data handling system. The phase meter 170 may comprise a frequency discontinuity detector for rapidly detecting any abnormal behavior of one of the two clocks.

The frequency generator 150 is connected to a number of frequency outputs 202, 204, 206, 208 of the master clock generation unit 100. In this embodiment the master clock generation unit 100 provides four frequency outputs. The frequency generator 150 is adapted for deriving an output reference frequency of 10.23 MHz from the primary clock and providing the output reference frequency at the frequency outputs 202, 204, 206, 208.

As noted previously, the master clock generation system 1 contains two identical master clock generation units 100, for cold redundancy. It is powered by a primary bus of a spacecraft, and provides discrete telemetry for on/off status, voltage and current monitoring and thermistor telemetry. The switching matrix 130, the frequency synthesizers 140, 145 and the phase meter 170 are commanded and supervised via a standard serial interface 192 connected to a control logic 180.

The master clock generation unit 100 will be described in more detail with reference to FIG. 3 and FIG. 4. The key elements of the architecture of the master clock generation unit are separate input and down-conversion stages for each input clock signal (i.e., the first and the second reference frequency according to 10.00 MHz or 10.0028 MHz), resulting in highest level of isolation between the input clock signals to preserve the clock performances and omit injection locking effects. Furthermore, primary and secondary (redundant) clocks can be chosen in any combination. This means that a selection of two RAFSs or two PHMs frequencies for the primary and secondary clock is possible. One single frequency synthesizer for the 10.23 MHz output reference frequency makes the output signal selection switch between two frequency synthesizers superfluous. Therefore, there is no risk of cross-coupling and relay contact bouncing. An internal detector for signal discontinuities in the phase meter allows the autonomous detection of frequency jumps or rapid frequency drifts to increase the operational safety of the master clock generation unit and system.

Figure 3:
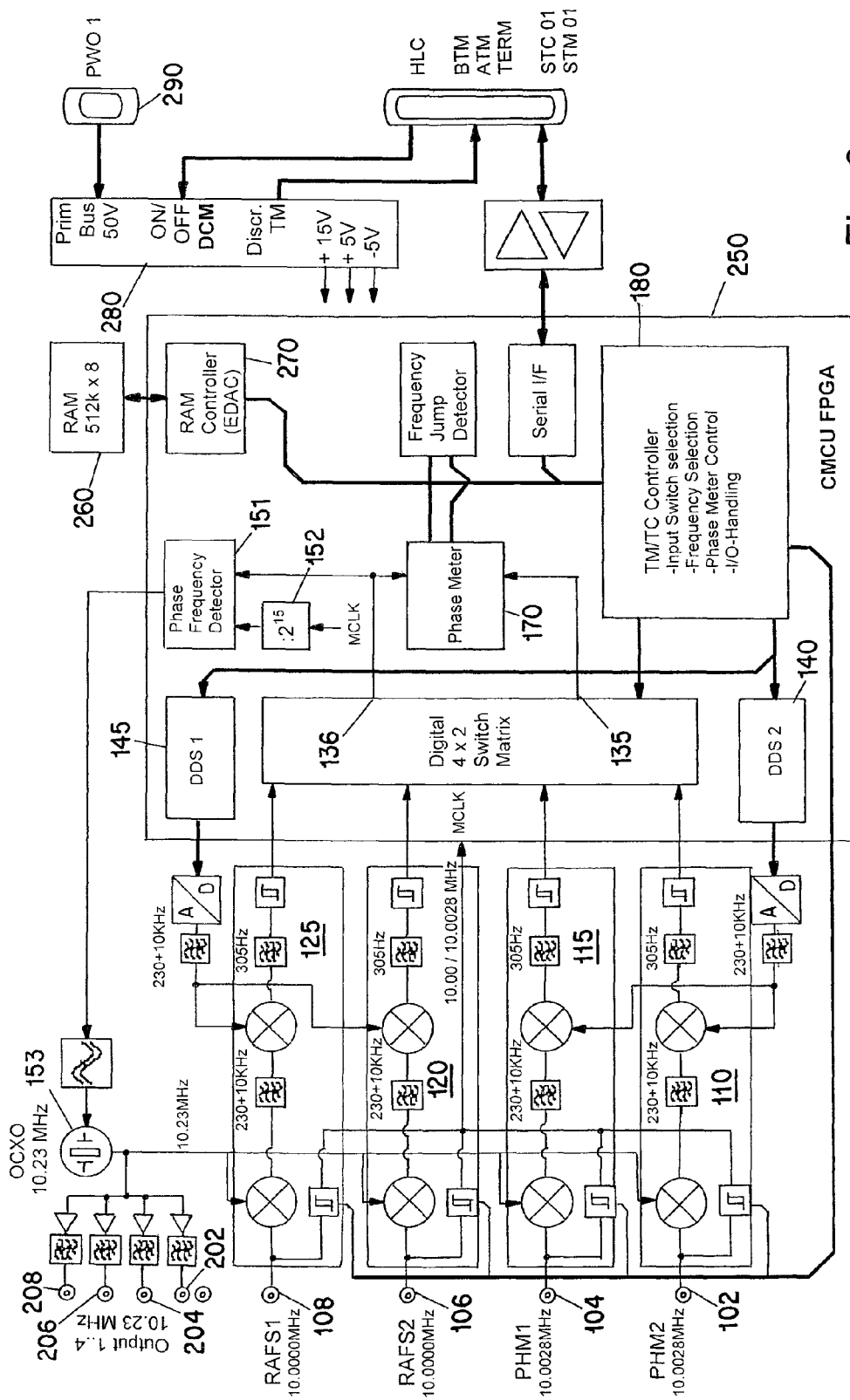
FIG. 3 is a block diagram of a master clock generation unit according to the invention, shown in greater detail.
Figure 4:
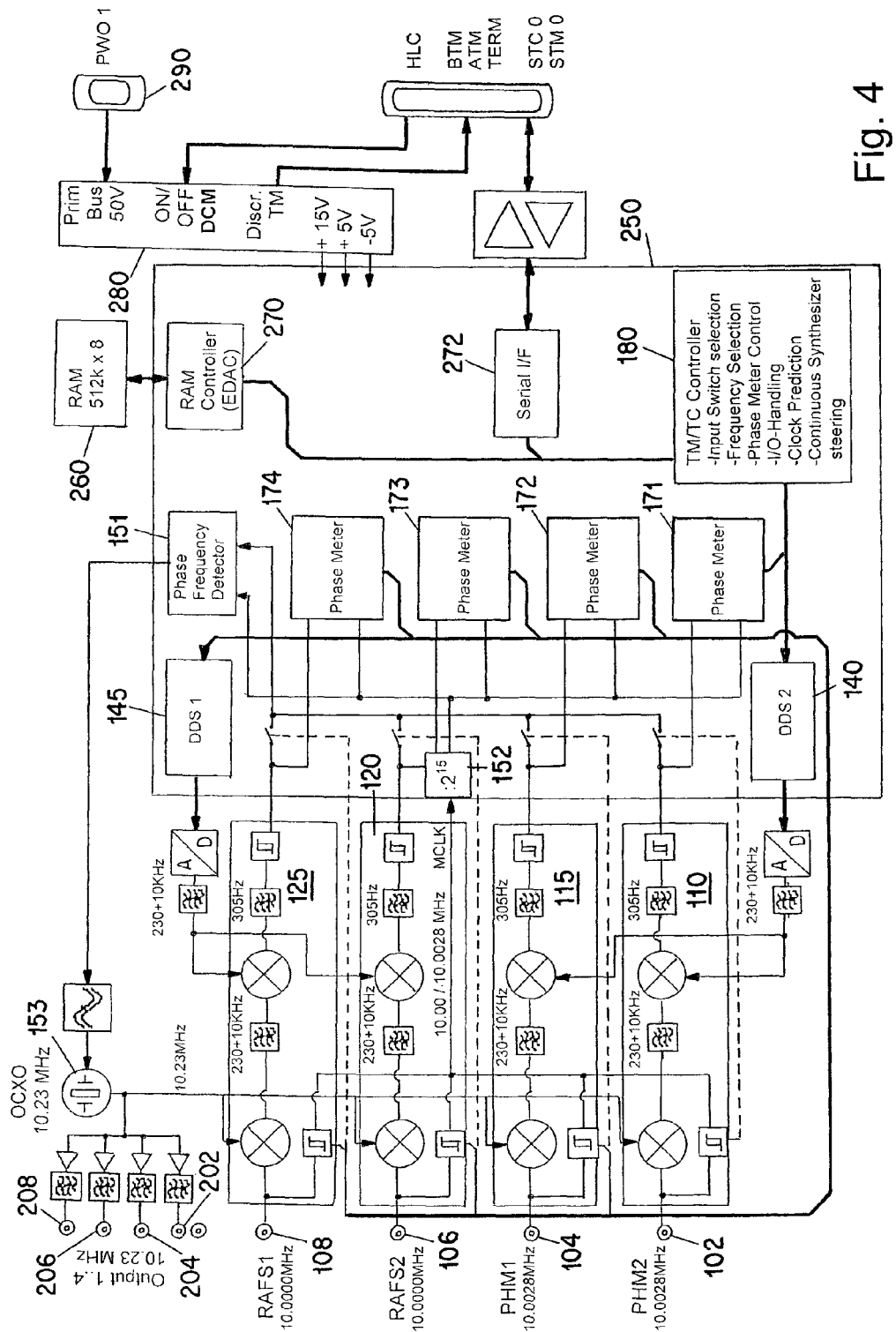
FIG. 4 is a block diagram of an enhanced master clock generation unit according to the invention.

Now referring to FIG. 3 up to four input signals (first and second reference frequencies according to RAFS and PHM) are applied to individual down-conversion stages being represented by the frequency converters 110, 115, 120, 125. By mixing the input signals with a 10.23 MHz frequency of an internal oscillator 153 (preferably an oven-controlled crystal oscillator OCXO), the input signals at the frequency inputs 102, 104, 106, 108 and their phase relations are down-converted to a first intermediate (or pre-intermediate) frequency of 230 kHz for the RAFS or 232.8 kHz for the PHM. A second down-conversion stage in each of the frequency converters 110, 115, 120, 125 uses the aforementioned frequency synthesizers 140, 145 as a local oscillator to tune its second intermediate frequency to the reference clock frequency divided by $2^N$ with preferably N=15 to 305 Hz which is the reference clock frequency divided by $2^{15}$. The second intermediate frequency of 305 Hz corresponds to the aforementioned intermediate frequency at the outputs of the frequency converters 110, 115, 120, 125. In case of the down-converters for the RAFS signals applied at frequency inputs 106, 108 the frequency synthesizer 145 must be tuned to 230 kHz to 305 Hz. In case of the PHM signals at the frequency inputs 102, 104 the frequency synthesizer 140 will be set to 232.86 kHz to 305 Hz. On this second intermediate frequency the signals within each frequency converter are converted from analog to digital form, and applied to the digital 4×2 switching matrix 130.

By commanding the switching matrix 130, the two clocks (i.e., the primary and secondary clock) to be used for further processing are selected and provided to the phase meter 170. The primary clock that is selected for generating the master timing reference MTR is provided to a digital phase frequency detector 151 which is part of the frequency generator 150 of FIG. 2. The phase frequency detector 151 compares the frequency of the primary clock to a 305 Hz signal derived from the clock's 10 MHz input signal by a frequency division of $2^{15}$. The error signal generated in the phase frequency detector 151 will be integrated within a PLL loop filter to control oscillator 153 having a frequency of 10.23 MHz. The oscillator 153 being an OCXO also provides the master clock generation unit's output signal and the four frequency outputs 202, 204, 206, 208.

The phase meter 170 compares the 305 Hz signal from the primary clock selected for controlling the master timing reference MTR (corresponding to the output reference frequency) with a second clock to be selected and routed through the switching matrix 130. The phase meter 170 is based on a start/stop counter having the at least same bit width as the reference clock frequency divider which is preferably 15 bit. It is clocked by the 10 MHz input signal of the primary clock. Because of the frequency division factor of $2^{15}$ of the input clock frequency, the start/stop counter maps the range of 360° to its range of possible values.

The measurement result of the start/stop counter is stored in programmable time intervals. In addition, the phase meter contains two counters, counting the 305 Hz periods between two measurements to detect the difference in magnitude of 360° cycles between two measurements. In this manner, the measurement ambiguity problems of a simple interval counter can be overcome. Based preferably on a sliding average of the differences between two successive phase values, a frequency discontinuity detector allows the rapid change of one of the input frequencies as a first contribution to a verification of the satellite timing system's integrity.

As outlined in FIG. 3, the frequency synthesizers 140, 145, the switching matrix 130, the phase meter 170, the phase frequency detector 151, the frequency divider 152, a RAM controller 270, a frequency jump detector 271, a serial interface 272 and the controller 180 are integrated on a chip, especially a FPGA or ASIC. The integrated chip 250 holds the command and control interpreter 180 and the serial interface 272 for handling serial telecommands/telemetry. To operate the master control unit 100 with a robust and space-qualified integrated chip, the lack of internal memory may require an external memory 260, for storing the measurement results and holding some register values. Although memory 260 may have excellent radiation parameters its content is preferably EDAC protected with 2 bit error detection and 1 bit error correction. Furthermore, a continuous memory scrubbing is performed. The integrated chip 150 is driven by just one single clock signal. This design consequently avoids the presence of multiple simultaneous clocks inside the chip 150 so that no jitter between clock grids can occur, affecting the performance of the frequency synthesizer 140, 145 or the phase meter 170.

The internal supply voltages of the master clock generation unit 100 are provided by a galvanic isolated power converter (DCM) 280. The power converter 280 interfaces with a primary power bus 290. The power converter 280 is switched on and off by high-level telecommands, signals its on/off state via status telemetry, provides analogue telemetry about the current consumption, secondary voltage and contains two thermistors for redundant telemetry data about internal temperatures.

This modified architecture has the following major advantages:

Only one frequency synthesizer with oven-controlled crystal oscillator (OCXO) is needed. This results in design safety since cross-coupling between two different oscillators can be avoided. Due to the fact that an output selection switch is removed, operational simplification is the result. The operational safety is increased: no abrupt phase jumps occur when switching from one to the other clock as these phase jumps are now smoothed by the PLL loop time constant. This avoids violating timing constraints, as they may be imposed by the digital logic of these successive payload components. Furthermore, there are power and mass savings.

The intermediate frequency of 305 Hz can be immediately reused for phase comparison of two clocks with different output frequencies. A duplication of the input circuits can be mostly compensated by parts saved in the frequency synthesizer and phase meter.

The noise floor of the phase frequency detector is improved due to the lower comparison frequency 305 Hz instead of 230 kHz The switching of the 305 Hz can be performed in digital domain. The cascaded relay switches become superfluous.

There is a safe and reliable isolation between the signal inputs.

It is possible to detect abrupt frequency changes due to the high resolution of the phase meter. Minor additional circuits enable verification of the integrity of the satellite.

The major advantage of the proposed concept for the master clock generation unit is its flexibility. As an option, instead of providing one phase meter four phase meters could be included measuring the drifts of all clocks against each other. This is outlined in FIG. 4, which shows four phase meters 171, 172, 173, 174 connected to the outputs of the frequency converters 110, 115, 120, 125 and to the frequency divider 152 receiving a 305 Hz signal derived from the clocks 10 MHz input signal by a frequency division of $2^{15}$.

Furthermore, the master clock generation unit 100 provides the hardware platform to generate a "composite clock" signal based on all available phase measurement results. This can be realized by using current state of the art algorithms that are applied in time generation. The composite clock signal is then made available at the outputs of the frequency generator 202, 204, 206, 208 by using the deviation of the composite clock signal to the reference frequency signal as selected for the division by $2^{15}$ in 152 to correct the DDS output frequencies 142, 147 accordingly.

The invention enables all these options. The enhancements according to the invention require greater processing power (e.g., a microcontroller embedded in the integrated chip 250) and a duplication of the phase meter, but no changes of the basic hardware concept.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A master clock generation unit for satellite navigation systems, said master clock generation unit comprising:

a first atomic clock signal having a first reference frequency and a second atomic clock signal having a second reference frequency, wherein the first and second reference frequencies are different frequencies;

a plurality of frequency inputs for receiving one of the first and second atomic clock signals;

a plurality of frequency converters each of which has a converter input connected to one of the frequency inputs and a converter output, wherein a first one of the plurality of frequency converters receives the first atomic clock signal and a second one of the plurality of frequency converters receives the second atomic clock signal, each of the frequency converters is supplied with an offset frequency by one or a number of frequency synthesizers, the offset frequency being selected according to whether the frequency converter of the plurality of frequency converters receives the first or second atomic clock signal so that each of the converter outputs provides the same intermediate frequency;

a switching matrix connected to each of the converter outputs for selecting one intermediate frequency as a primary clock provided at a first matrix output and another intermediate frequency as a secondary clock provided at a second matrix output;

a frequency generator having a generator input directly connected to the first matrix output and connected to a number of frequency outputs of the master clock generation unit, the frequency generator being adapted for deriving an output reference frequency from the primary clock, and providing the output reference frequency at the number of frequency outputs; and a phase meter having a first meter input directly connected to the first matrix output and a second meter input connected to the second matrix output for determining a phase difference between the primary and the secondary clock for detecting abnormal behavior.

2. The clock generation unit according to claim 1, comprising four frequency inputs, two of which receive the atomic clock signal having the first reference frequency, with the other two receiving the atomic clock signal having the second reference frequency.

3. The clock generation unit according to claim 1, wherein the first reference frequency corresponds to 10.0028 MHz according to PHM.

4. The clock generation unit according to claim 1, wherein the second reference frequency corresponds to 10.00 MHz according to RAFS.

5. The clock generation unit according to claim 1, wherein each of the frequency converters comprises a first conversion stage for mixing the first reference frequency and the second reference frequency, respectively, with a further reference frequency, to generate respective first and second pre-intermediate frequencies, before tuning the first and second pre-intermediate frequencies to the same intermediate frequency provided at each of the converter outputs in a second conversion stage.

6. The clock generation unit according to claim 5, wherein the reference frequency is the output reference frequency provided by an oscillator of the frequency generator of the clock generation unit.

7. The clock generation unit according to claim 1, wherein one of the intermediate frequencies fed to the switching matrix can be chosen as primary clock and another intermediate frequency can be chosen as secondary clock in the switching matrix.

8. The clock generation unit according to claim 1, wherein the frequency generator comprises a phase frequency detector for comparing the first clock with a signal derived from the second reference frequency, by frequency division.

9. The clock generation unit according to claim 8, wherein an error signal generated by the frequency generator is used to control the reference frequency.

10. The clock generation unit according to claim 8, wherein the phase meter comprises a phase meter arrangement that includes phase meters connected to each of an assigned converter output for receiving the intermediate frequencies and connected to a reference clock signal as provided to the phase frequency detector of the frequency generator.

11. The clock generation unit according to claim 1, wherein the phase meter stores measurement samples in predetermined time intervals for later retrieval.

12. The clock generation unit according to claim 1, wherein the phase meter comprises a frequency discontinuity detector.

13. The clock generation unit according to claim 1, wherein the output reference frequency corresponds to 10.23 MHz.

14. The clock generation unit according to claim 1, wherein it is powered by a primary bus, being a regulated bus providing a voltage of 50 V, from a spacecraft.

15. The clock generation unit according to claim 1, wherein the switching matrix, the synthesizer frequency and the phase meter are controlled via a data interface.

16. A master clock generation system comprising two master clock generation units according to claim 1 for redundancy purposes.

17. A method for a master clock generation unit for satellite navigation systems, said master clock generation unit, the method comprising:
  receiving, by a plurality of frequency inputs, one of the first and second atomic clock signals, wherein the first atomic clock signal has a first reference frequency and the second atomic clock signal has a second reference frequency, and wherein the first and second reference frequencies are different frequencies;
  receiving, by a first one of a plurality of frequency converters, the first atomic clock signal;
  receiving, by a second one of the plurality of frequency converters, the second atomic clock signal;
  supplying, by a first frequency synthesizer to the first one of the plurality of frequency converters, a first offset frequency;
  supplying, by a second frequency synthesizer to the second one of the plurality of frequency converters, a second offset frequency, wherein the first and second offset frequencies are different offset frequencies so that outputs of each of the plurality of frequency converters provides the same intermediate frequency;
  a switching matrix connected to each of the converter outputs for selecting one intermediate frequency as a primary clock provided at a first matrix output and another intermediate frequency as a secondary clock provided at a second matrix output;
  deriving, by a frequency generator having a generator input directly connected to the first matrix output and connected to a number of frequency outputs of the master clock generation unit, an output reference frequency from the primary clock;
  providing, by the frequency generator, the output reference frequency at the number of frequency outputs; and
  determining, by a phase meter having a first meter input directly connected to the first matrix output and a second meter input connected to the second matrix output, a phase difference between the primary and the secondary clock for detecting abnormal behavior.

18. The method according to claim 17, further comprising:
  mixing, by a first conversion stage of the first one of the plurality of frequency converters, the first reference frequency with a further reference frequency, to generate a first pre-intermediate frequency;
  mixing, by a first conversion stage of the second one of the plurality of frequency converters, the second reference frequency with a further reference frequency, to generate a second pre-intermediate frequency; and
  tuning the first and second pre-intermediate frequencies to the same intermediate frequency provided at each of the converter outputs in a second conversion stage.

19. The method according to claim 18, wherein the reference frequency is the output reference frequency provided by an oscillator of the frequency generator of the clock generation unit.

20. The method according to claim 17, wherein one of the intermediate frequencies fed to the switching matrix is chosen as primary clock and another intermediate frequency is chosen as secondary clock in the switching matrix.

* * * * *